United States Patent Office.

EDUARD ULLRICH, OF HÖCHST-ON-THE-MAIN, ASSIGNOR TO CARL ROTH, OF BERLIN, AND THE FARBWERKE, VORMALS MEISTER, LUCIUS & BRÜNING, OF HÖCHST-ON-THE-MAIN, GERMANY.

PRODUCTION OF DIMETHYLDIETHYLTHIONIN=BLUE.

SPECIFICATION forming part of Letters Patent No. 366,639, dated July 12, 1887.

Application filed January 13, 1887. Serial No. 224,282. (No specimens.) Patented in France December 24, 1885, No. 173,137; in Germany December 25, 1885, No. 38,573, and in England January 1, 1886, No. 43.

*To all whom it may concern:*

Be it known that I, EDUARD ULLRICH, doctor of philosophy, a citizen of the Empire of Germany, residing at Höchst-on-the-Main, in the Empire of Germany, have invented certain new and useful Improvements in Dimethyldiethylthionin-Blue; and I do hereby declare the following to be a full, clear, and exact description of the invention, such as will enable others skilled in the art to which it appertains to make and use the same.

This invention relates to a blue dye-stuff or coloring-matter, which I term "dimethyldiethylthionin-blue," the hydrochlorate of dimethyldiethylthionin,

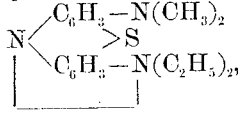

being an essential constituent of the same. This blue dye-stuff or coloring-matter I produce by joint oxidation of paramido-dimethylaniline $C_6H_4 \begin{cases} (1)N(CH_3)_2 \\ (4)NH_2 \end{cases}$ and diethylaniline in presence of a hyposulphite, precipitating the coloring-matter from its solution by means of zinc chloride or common salt. According to the said process twelve parts of dimethylaniline are dissolved in diluted hydrochloric acid (forty parts of water and sixty-five parts of concentrated hydrochloric acid) and by the addition of seven and one-tenth parts of nitrite of sodium and subsequent addition of zinc converted into amido-dimethylaniline. A quantity of zinc is added necessary to use up all the free hydrochloric acid. The solution thus obtained is diluted with water to about five hundred parts, and then I add eighteen parts of hydrochlorate of diethylaniline and twenty-five parts of hyposulphite of sodium. Now, I oxidize by adding a solution of twenty-five parts of potassium-dichromate, boil for about two hours, add the quantity of sulphuric acid necessary to bind the chromoxide and the alkalies, and expel the sulphurous acid by further boiling. Then the dissolved leuco compound is converted into the coloring-matter by adding an oxidizing agent, and, finally, it is precipitated by means of common salt.

The coloring-matter is a bronze-like powder and of brown color. The blue solution of the same can be easily reduced into a colorless liquid. Oxidizing agents restore the original shade. By means of tannin and emetic tartar the coloring-matter is fixed in the fiber so that it will resist washing. Quicksilver, chloride, and potassium-bichromate precipitate the solution, the precipitate being of a dark-blue color.

The identical coloring-matter will be obtained by joint oxidation of paramido diethylaniline and dimethylaniline in presence of a hyposulphite. The process for producing the coloring matter according to this method is analogous to the process described hereinbefore.

What I claim as new, and wish to secure by Letters Patent, is—

As a new product, dimethyldiethylthionin-blue produced by joint oxidation of paramido-dimethylaniline and diethylaniline in presence of a hyposulphite or of paramido-diethylaniline and dimethylaniline in presence of hyposulphite, and having the characteristics above set forth.

In testimony whereof I affix my signature in presence of two witnesses.

EDUARD ULLRICH.

Witnesses:
 JEAN GRUND,
 JACOB MUELLER.